US012366115B2

(12) United States Patent
Vanhoutte et al.

(10) Patent No.: US 12,366,115 B2
(45) Date of Patent: Jul. 22, 2025

(54) SYSTEM FOR MOUNTING A ROLLABLE SCREEN

(71) Applicant: RENSON NV, Waregem (BE)

(72) Inventors: Steven Vanhoutte, Deerlijk (BE); Sofie Rumbaut, Ghent (BE); Jonas Maertens, Ghent (BE); Maxim Solomaniuck, Ouwegem (BE); Michiel Desplenter, Waregem (BE); John Meinster, Gentbrugge (BE)

(73) Assignee: RENSON NV, Waregem (BE)

( * ) Notice: Subject to any disclaimer, the term of this patent is extended or adjusted under 35 U.S.C. 154(b) by 366 days.

(21) Appl. No.: 17/924,431

(22) PCT Filed: Apr. 23, 2021

(86) PCT No.: PCT/IB2021/053358
§ 371 (c)(1),
(2) Date: Nov. 10, 2022

(87) PCT Pub. No.: WO2021/229333
PCT Pub. Date: Nov. 18, 2021

(65) Prior Publication Data
US 2023/0184031 A1 Jun. 15, 2023

(30) Foreign Application Priority Data
May 12, 2020 (BE) .................................. 2020/5322

(51) Int. Cl.
*E06B 9/44* (2006.01)
*E06B 9/50* (2006.01)

(52) U.S. Cl.
CPC . *E06B 9/44* (2013.01); *E06B 9/50* (2013.01)

(58) Field of Classification Search
CPC ..... E06B 9/44; E06B 9/46; E06B 9/50; E06B 9/72; E06B 9/48; E06B 9/40
See application file for complete search history.

(56) References Cited

U.S. PATENT DOCUMENTS 8,403,020 B2 * 3/2013 Rasmussen ............... E06B 9/50 160/323.1
8,800,634 B2 * 8/2014 Gramsch .................. E06B 9/50 160/323.1

(Continued)

FOREIGN PATENT DOCUMENTS

BE 1025413 A1 2/2019
CN 104727726 A 6/2015

(Continued)

OTHER PUBLICATIONS

Belgian Search Report from corresponding Belgian Application No. BE202005322, Mar. 1, 2021.

(Continued)

*Primary Examiner* — Johnnie A. Shablack
(74) *Attorney, Agent, or Firm* — Workman Nydegger

(57) ABSTRACT

A system for mounting a rollable screen, includes: a screen roll defining an end having a hollow tube; a coupling piece including: a neck element, having a sleeve adapted to be positioned in axial direction inside the tube. The contact surfaces included in the sleeve contact the tube, and recess surfaces in the sleeve define axial channels between the neck element and the tube; a transitional element fixedly connected to the neck element, one or multiple anchoring elements, adapted to fasten the neck element detachably to the tube. In an anchored state the anchoring elements are clamped inside the axial channels, with an even clamping along the axial direction.

15 Claims, 10 Drawing Sheets

(56) References Cited

U.S. PATENT DOCUMENTS

| | | | | |
|---|---|---|---|---|
| 8,944,138 | B2 * | 2/2015 | Feldstein | E06B 9/72 160/310 |
| 9,963,935 | B2 | 5/2018 | Faller | |
| 11,060,353 | B2 * | 7/2021 | Kirby | E06B 9/72 |
| 11,105,150 | B2 * | 8/2021 | Lai | E06B 9/44 |
| 11,371,283 | B2 * | 6/2022 | Wang | E06B 9/42 |
| 11,686,151 | B2 * | 6/2023 | Graybar | E06B 9/42 160/310 |
| 11,970,906 | B2 * | 4/2024 | Francoeur | E06B 9/50 |
| 2006/0272782 | A1 * | 12/2006 | Nichols, Jr. | E06B 9/44 160/120 |
| 2008/0142171 | A1 * | 6/2008 | Koop | E06B 9/50 160/243 |
| 2010/0200176 | A1 * | 8/2010 | Magli | E06B 9/72 160/300 |
| 2013/0000091 | A1 * | 1/2013 | Wills | E06B 9/50 29/282 |
| 2017/0241201 | A1 * | 8/2017 | Buccola, Jr. | H02K 7/003 |
| 2018/0023340 | A1 * | 1/2018 | Goldberg | E06B 9/174 160/324 |
| 2018/0291682 | A1 | 10/2018 | Walter-Seifart | |
| 2023/0062979 | A1 * | 3/2023 | Schofield | E06B 9/44 |
| 2023/0184031 | A1 * | 6/2023 | Vanhoutte | E06B 9/50 160/238 |
| 2024/0328252 | A1 * | 10/2024 | Ely | E06B 9/68 |

FOREIGN PATENT DOCUMENTS

| | | | |
|---|---|---|---|
| CN | 105074114 | A | 11/2015 |
| EP | 3431678 | A1 | 1/2019 |
| FR | 2795765 | A1 | 1/2001 |
| FR | 2795765 | B1 * | 9/2001 |
| FR | 2846364 | A1 | 4/2004 |
| FR | 2846364 | B1 * | 7/2005 |
| JP | S63106894 | U | 7/1988 |
| JP | H0380896 | U | 8/1991 |
| WO | 2006102894 | A1 | 10/2006 |
| WO | 2007077632 | A1 | 7/2007 |
| WO | 2017195087 | A1 | 11/2017 |

OTHER PUBLICATIONS

International Search Report from corresponding PCT Application No. PCT/IB2021/053358, Jul. 16, 2021.

* cited by examiner

SYSTEM FOR MOUNTING A ROLLABLE SCREEN

TECHNICAL AREA

The present invention generally relates to a rollable screen, for example a roller blind or fabric awning. The invention provides in particular a solution for mounting a rollable screen which allows for a detachable attachment of a coupling piece to a screen tube, wherein the smooth surface of the screen roll is not disturbed, and wherein the occurrence of play is prevented in a durable manner.

BACKGROUND OF THE INVENTION

In systems for fabric awnings, e.g., installed outside of a house, a fabric is often used which may be rolled up or rolled down at will. The fabric is herein attached to a screen roll which is rotatable about its axis. The screen roll is typically a hollow tube, which provides space to accommodate a tube motor. The tube motor is fixed with its rotating sleeve on the inside wall of the screen roll, and rolling up and rolling down may be driven electrically through electrical cables to the motor. Typically, an end piece or coupling piece is attached to each end of the screen roll, so that the screen roll is supported at both ends. The end piece comprises for example an axis at the bearing side, which connects to a slide bearing mounted in the housing. Typically, the housing has a motor slide at the motor side in which the end piece of the screen roll is supported. The end pieces or coupling pieces must be attached to the screen roll in a detachable manner, so that access to the interior of the screen roll may still be provided, for example in case of problems with the motor.

In the state of the art, solutions are presented for an end piece or coupling piece which is detachably connected to a screen tube. For example, in BE1025413, a hollow screen tube is provided, and tube plugs are disposed in the cavity at the ends of the screen tube. Such a tube plug has a cylindrical part having a circumference adjusted to the inner circumference of the hollow screen tube; when mounting, the tube plug is pushed or tapped into the hollow tube, such that the cylindrical part is clamped inside the tube cavity. Typically, the cylindrical part possesses exterior ribs to realize clamping, as may also be seen in U.S. Pat. No. 8,403,020. Such a type of solution has as disadvantage that in the course of time, more specifically after a certain number of rotations of the screen roll, play arises between the tube plug and the screen tube. A relative movement of the plug relative to the tube is herein possible, both an axial shift and a swinging movement of the plug inside the tube. Such an arising of play especially occurs at the bearing side, where the fixation of the tube plug is solely based on clamping of the relatively short cylindrical part of the plug in the tube. The play is disadvantageous, since it produces an annoying noise when rolling the screen up and down and limits the general durability of the screen device.

In some existing solutions, the fixation of the tube plug inside the screen tube is improved by using screws which are disposed through the wall of the screen tube and the cylindrical part of the plug. The screws, however, cause an unevenness at the outside of the screen roll, which may hinder the rolling down of the screen or may cause an imprint on the fabric.

An objective of the present disclosure is to describe a system that overcomes one or more of the described disadvantages found in the state of the art. More specifically, an objective of the present disclosure is to describe a system for mounting a rollable screen which allows for a detachable connection of a coupling piece to a screen tube, wherein the smooth surface of the screen roll is not disturbed, and wherein the development of play is prevented in a durable manner.

SUMMARY OF THE INVENTION

According to the present invention, the objectives identified above are realized by a system for mounting a rollable screen comprising:

- a screen roll adapted to roll-up and unroll the screen through rotation about an axial direction, and comprising an end having a hollow tube;
- a coupling piece comprising:
  - a neck element, comprising a sleeve adapted to be positioned in axial direction inside the tube, wherein contact surfaces comprised in the sleeve contact the tube, and wherein recess surfaces comprised in the sleeve define axial channels between the neck element and the tube;
  - a transitional element fixedly connected to the neck element, adapted to support the screen roll during the rolling-up or unrolling,
- one or multiple anchoring elements, adapted to fasten the neck element detachably to the tube, wherein, in an anchored state, the anchoring elements are clamped inside the axial channels, with an even clamping along the axial direction.

In other words, the invention relates to a system for mounting a rollable screen. The screen is for example made from a plastic or fabric material, for example a PVC fabric or a coated glass fiber fabric and serves as awning or blind installed at the outside of a building. The awning is active when the screen is rolled down and may be removed by rolling the screen up. Other applications are however also possible. The system comprises a screen roll, typically an elongated cylinder which is rotatable about the axial direction. The screen roll comprises an end having a hollow tube, meaning that a hollow portion is present at at least one end of the screen roll.

The system further comprises a coupling piece. A coupling piece, also referred to as end piece or tube plug, is meant to be connected to the screen tube at one side, and to connect to an element for supporting the screen roll at the other side. The coupling piece comprises a neck element, and a transitional element fixedly connected to the neck element. In a mounted state, the neck element is located inside the cavity of the screen tube, while the transitional element is located outside the screen tube. The transitional element is adapted to support the screen roll when rolling up and rolling down. The transitional element is for example an axis which may be mounted in a bearing provided in the screen housing, or the transitional element may be adapted to connect to such an axis. In that way, the transitional element forms the transition between the actual screen roll and the supporting provisions.

The neck element comprises a sleeve adapted to be positioned in an axial direction inside the tube. The sleeve refers to an outside surface or outside wall of the neck element. The shape of the neck element is such that a central axis may be defined. In a mounted state, the central axis of the neck element is according to the direction defined by the screen tube. The length of the neck element is the dimension of the neck element measured according to the central axis, thus measured in the axial direction. Similarly, the length of a contact surface or recess surface comprised in the sleeve of the neck element refers to the dimension measured according to axial direction.

Positioning the neck element inside the tube refers to disposing the neck element inside the cavity of the tube. A positioned state of the neck element or the coupling piece refers to a state wherein the neck element is located inside the tube, but the anchoring elements are not necessarily disposed yet. Positioning the coupling piece is typically a first step in the mounting process, and occurs for example by sliding the neck element into the hollow tube or by tapping or pressing it into the hollow tube with the necessary force.

The sleeve of the neck element comprises contact surfaces and recess surfaces. In a positioned state, the contact surfaces contact the tube. This means that the shape, dimensions and position of the contact surfaces are such that, in the positioned state, the neck element is held in a fixed position inside the tube. In an embodiment, this is accompanied by clamping, where a certain amount of force is required to dispose the neck element inside the tube. Multiple embodiments are possible with regard to the implementation of the contact surfaces. The sleeve comprises, for example, axial ribs extending over the length of the neck element, and the neck element contacts the inside wall only at the level of the axial ribs. The axial ribs may be located at positions completely separated from the recess surfaces and/or they may form the edge of a recess surface. In another possible embodiment, a contact surface is that part of the sleeve located between two recess surfaces, and there is contact between the neck element and the inside surface of the tube at all parts of the sleeve, except for at the recess surfaces. In an embodiment, the contact surfaces are continuous over the entire length of the neck element. In another embodiment, interruptions are present in the axial direction, or the contact surfaces do not cover the entire length of the neck element.

In a positioned state, the recess surfaces define axial channels between the neck element and the tube. An axial channel is an elongated space, which, in a positioned state, extends in axial direction between a recess surface of the neck element and the inside wall of the tube. The shape of the recess surfaces is such that these form recesses in the sleeve of the neck element, and, in a positioned state, these recesses, together with the inside wall of the tube, define axial channels. This means that the recess surfaces, together with the inside wall of the tube, contribute to forming axial channels, but an axial channel does not necessarily have to be completely closed; there may for example be no contact at any point between a recess surface and the inside wall of the tube, so that a cross section of the channel at two locations shows a limited opening between the sleeve and the tube. In another embodiment, an axial channel is completely closed and delimited by a recess surface and the tube.

A recess surface may continue over the entire length of the neck element, or only over a portion of it. Typically, a recess surface starts at the end of the neck element where the transitional element is located, so that through the side of the coupling piece, which is not located in the tube, anchoring elements may be disposed in the axial channels. In a possible embodiment, the shape of a recess surface is such that, in a positioned state, an axial channel is obtained having a substantially constant cross section, so substantially the same cross section over the entire length of the channel. In another embodiment, an axial channel has a variable cross section, the channel may for example widen or narrow in the axial direction.

The system comprises furthermore one or multiple anchoring elements, adapted to fasten the neck element detachably to the tube, wherein, in an anchored state, the anchoring elements are clamped inside the axial channels, and wherein the obtained clamping is evenly distributed according to the axial direction. A detachable fastening means that the coupling piece may be detached in a non-destructive way after attachment to the screen roll. Optionally, an earlier attachment may leave traces, for example when screws were used as anchoring elements which leave an imprint in the material of the tube and the recess surfaces.

The shape and dimensions of the anchoring elements are such that the anchoring elements may be placed inside the axial channels defined by the recess surfaces and the side wall of the tube, after positioning the neck element inside the tube. The anchored state refers to the state in which the anchoring elements are placed in the axial channels. In the anchored state, the anchoring elements are clamped inside the axial channels. This means that there is contact between the anchoring element and the inside wall of the tube, and between the anchoring element and a recess surface of the neck element. Thus, an anchoring element is not loose in an axial channel, there is no play. Typically, the cross section of an anchoring element is such that this is slightly larger than the cross section of the axial channel in a positioned state, for example a cylindrical anchoring element having a diameter slightly larger than the available diameter of a channel in a positioned state. A certain amount of force is then required to dispose the cylindrical anchoring element in the channel, and in an anchored state, the anchoring element is clamped inside the channel by pressure applied because of the tube and the neck element. The axial channel in an anchored state may differ slightly from the axial channel in a positioned state, because of occurrence of elastic deformation in the material of the tube and/or the neck element.

Except for pure clamping, which counts on the friction between surfaces and the applied pressures, an additional anchoring may also be obtained which is accompanied by a plastic deformation of the tube and/or the recess surfaces. An anchoring element may for example be provided with screw thread, and this thread cuts in the material of the tube and/or the anchoring surfaces when disposing the anchoring element. The tube is for example made of (galvanized) steel, aluminum or CFRP (Carbon Fibre Reinforced Polymer), the coupling piece is for example made of a plastic. Then plastic deformation of the tube and/or the recess surface arises, which may be seen from an imprint of the thread in the material of the tube and/or recess surfaces which remains after removing the anchoring element. In other words, in this embodiment, the axial channel is plastically deformed while disposing an anchoring element. Because the dimension and shape of the screw are chosen such that the diameter is slightly too large with respect to the available diameter of an axial channel in positioned state, a cutting effect is created, where the screw makes space for itself by pushing material of the tube and/or recess surface away, causing plastic deformation. By pushing this material away, the screw is clamped inside the channel in anchored state, and the visible imprint after demounting is a proof of that clamping. On the other hand, an additional anchoring is created because the thread hooks in the imprint made, so that for example a relative movement in axial direction is hindered. In another embodiment, it is possible that the anchoring element comprises thread, but no plastic deformation is created in the material of the tube and/or recess surface, because the tube and/or neck element are made of a harder material. In that case the screw is clamped inside the axial channel, because the channel in positioned state provides just too little space for the screw, but no plastic deformation of the channel occurs.

Regardless of the specific embodiment of the anchoring elements, the clamping of an anchoring element in the invention should be such that it is even over the axial direction. An anchoring element may be clamped over its entire length, or over part of its length. The latter is for example the case when the anchoring elements are longer than the axial channels, or when an anchoring element contains a pointy or more narrow end which is not clamped. Clamping may occur within the entire length of an axial channel, for example when the anchoring elements are longer than the axial channels or may occur within a part of the axial channel, when an anchoring element is shorter than the channel.

In all embodiments of the invention, the clamping is even along the axial direction, which means that over that length where there is clamping between the channel and the anchoring elements, this clamping is even or uniform over the axial direction. In other words, seen along the axial direction, there is a virtually equal clamping at every location, so not one location with a lot of clamping and another location with very little clamping. This means that the shape and the dimensions of the anchoring elements and of the axial channels should be matched in order to obtain such even or uniform clamping. In an embodiment, both the axial channel and the anchoring element have a constant cross section. The recess surfaces are for example made such that axial channels are defined which do not widen or narrow in axial direction, and the anchoring elements are cylindrical components or screws having a constant cross section. In another embodiment, an axial channel has a variable cross section, and the shape of the anchoring element is adjusted to this. The anchoring element is for example a wedge which is placed inside a channel of which the cross section widens in axial direction. A recess surface forms then an inclined surface with respect to the remainder of the sleeve. To the contrary, examples of solutions outside the invention, wherein no even clamping over the axial direction is obtained, are: a conical anchoring element which is placed inside a channel having a constant cross section, a wedge-shaped anchoring element which is place inside a channel having a constant cross section, a drop-in anchor of which the cross section changes on impact, placed in a channel having a constant cross section, an anchoring element having a constant cross section placed in a widening or narrowing channel, etc.

First, placing the anchoring elements allows realization of a better fixation than when fixation only relies on clamping the neck element in the tube through the contact surfaces.

Moreover, the clamping realized through the anchoring elements is even over the axial direction. Because of this, an improved fixation over the entire length of the neck element is obtained. This causes a much more durable fixation than when the clamping of an anchoring element is realized at only one location or at a limited zone. The even clamping is also realized automatically, because the shape of the recess surfaces and the anchoring elements are matched, and the anchoring elements are thus led through the axial channels when being placed. This contributes to a simple placement of the anchoring elements and guarantees a correct placement with even clamping.

Furthermore, the invention has the advantage that the smooth outside surface of the screen tube is not disturbed. The fixation of the coupling piece is realized completely inside the cavity of the tube, and no attachment means are disposed through the tube wall. Moreover, the invention allows an optimal combination of clamping through the contact surfaces and clamping/anchoring through the anchoring elements. Because of this, at one hand sufficient fixation may be realized, and on the other hand deformations of the tube are avoided. Maintaining the original shape of the screen roll, having a smooth surface, guarantees that rolling up and rolling down is not disturbed, and no imprint occurs on the screen fabric.

Finally, the invention is generally applicable: the coupling piece may be attached to any screen roll having a hollow end, no special provisions on the screen roll itself are required, and the solution is applicable on a wide range of roll diameters. Where necessary, the number of anchoring elements or the diameter thereof may be scaled with the roll diameter in function of the diameter of the screen roll.

Optionally, the neck element is adapted to be positioned in axial direction inside the tube, and the neck element is hereby clamped in the tube through the contact surfaces. This means that the shape, dimensions and position of the contact surfaces are such that, in a positioned state, the neck element is clamped inside the tube. Thus, a certain amount of force is required in order to dispose the neck element inside the tube. For example, a circle taken around the contact surfaces is slightly larger than the inner diameter of the tube, so the contact surfaces wear off a little at tapping the neck element in. This also compensates for tolerances on the dimensions of the inner diameter of the tube. Clamping the neck element in the tube means that the fixation of the coupling piece to the screen roll is partly a result of the clamping through the contact surfaces and is partly realized through the anchoring elements. In that way, it is avoided that a large number of anchoring elements is necessary in order to achieve the desired fixation, which reduces the risk of the arising of deformations in the tube, renders the solution cheaper and reduces the time required for mounting.

Optionally, as defined by claim 3, at least in certain cross sections of the neck element, reinforcing material is present inside the sleeve, adapted to increase the radial stiffness of the neck element. This means that reinforcing material is present of which the shape, position and material type are such that radial stiffness of the neck element is increased, as compared to a neck element in which this reinforcing material is not present. A high radial stiffness means that the neck element slightly deforms elastically at disposing a load in the radial direction on the sleeve of the neck. The radial direction refers to a direction perpendicular to the central axis of the neck element. When the neck element is positioned inside a cylindrical tube, the radial direction of the cylindrical tube defines the radial direction of the neck element as well.

Various embodiments are possible for the reinforcing material. The reinforcing material comprises for example radial ribs, placed inside the sleeve having a certain thickness. Such radial ribs result in an increased radial stiffness. The radial ribs may be continuous in the longitudinal direction of the neck or may be interrupted at certain locations. In another embodiment, the sleeve of the neck element refers to the outer surface of the neck element, and the reinforcing material forms a solid fill within this outer surface. This fill may also be continuous over the longitudinal direction or be interrupted at certain locations. In yet another embodiment, the sleeve of the neck element refers to the outer surface of the neck element, and a thick wall of the neck element is located within this outer surface.

Providing reinforcing material inside the sleeve has as an advantage that due to the additional stiffness, pressures applied by the anchoring element on the neck element are distributed homogeneously to the contact surfaces. In that way, an optimal and even clamping is obtained over the circumference of the neck element, which contributes to a durable anchoring without the arising of play.

Optionally, as defined by claim 4, the reinforcing material is continuous in the axial direction over a distance at least equal to the length of the recess surfaces measured in the axial direction. This means that each cross section of the neck element comprising a cross section of the recess surfaces also comprises reinforcing material. In that way, the reinforcing material is located at the level of those positions where the anchoring elements will be disposed. Thus, pressures applied by the anchoring elements are distributed to the contact surfaces, and over the length of the anchoring elements. This contributes further to a durable anchoring without the arising of play.

Optionally, the reinforcing material consists of reinforcing ribs, which in certain cross sections form a radial connection between the sleeve and a central element within the cross sections. A central element is for example a ring positioned centrally inside the neck element, or one point centrally inside the neck element. In those cross sections of the neck element where reinforcing material is present, the reinforcing ribs are in radial direction, between the sleeve and the central element. The reinforcing ribs increase the radial stiffness of the neck element. The advantage of reinforcing ribs is that the radial stiffness is increased in a way in which less material is required than when working, for example, with a solid filling of the neck element. This contributes to a reduced weight and material cost of the coupling piece.

Optionally, the radial connection is formed at least for a number of said reinforcing ribs between one of the recess surfaces and the central element or between one of the contact surfaces and said the element. This means that reinforcing ribs are present which each connect a recess surface to the central element, and that reinforcing ribs are present which each connect a contact surface to the central element. This ensures an optimal transmission of the pressure from an anchoring element to a contact surface. In possible embodiments, it is possible that also one or multiple reinforcing ribs are present which are radial ribs between sleeve and central element, but which do not form a connection of respectively a contact surface or recess surface to the central element.

Optionally, the recess surfaces are continuous in axial direction over a distance equal to the length of the neck element measured in axial direction, and the recess surfaces have substantially the same cross section over their entire length measured in axial direction. This means that the recess surfaces form axial channels together with the tube which do not substantially widen or narrow in axial direction, thus, straight channels having a substantially constant cross section. Optionally, it is possible that due to the production technique used for manufacturing the coupling piece, the cross section is not perfectly constant. The coupling piece may for example be manufactured by means of a mold, where the wall thickness at the level of the recess surfaces slightly reduces deeper in the tube, in order to allow the piece to be removed from the mold at production.

Moreover, these axial channels run over the entire length of the neck. The advantage of such constant straight channels is that it is impossible to place the anchoring elements wrongly: when they are disposed inside the axial channels, an even clamping is automatically obtained everywhere. This contributes to a simplified mounting, and to guaranteeing a durable anchoring.

Optionally, the anchoring elements have a length at least equal to the length of the neck element measured in axial direction. Thus, the anchoring elements may have a length, measured in axial direction, equal to the length of the neck element. In another embodiment, the anchoring elements are longer than the neck elements. In an anchored state, the anchoring elements protrude for example a little with respect to the neck at the end without transitional element. In this way, a proper anchoring is obtained, over the entire length of the neck element. This also allows the use of a standard type screws within different applications, also in those applications in which the neck element is somewhat shorter.

Optionally, the anchoring elements have a profile, and in an anchored state a plastic deformation is present in the recess surfaces and/or in the tube corresponding to an imprint of the profile. A profile refers to a surface which is not smooth, but in which irregularities such as protrusions and/or notches are present. An anchoring element contains for example concentrical rings, or a thread according to a helical pattern. Pressing the profile into the material of the tube and/or the neck element causes a plastic deformation of the tube and/or the recess surface. The tube is for example made from (galvanized) steel, aluminum or CFRP (Carbon Fibre Reinforced Polymer), the coupling piece is for example made from a synthetic material such as plastic. The plastic deformation is visible as an imprint of the profile in the material of tube and/or recess surface which remains after removing the anchoring element. If the dimension and shape of an anchoring element having thread are chosen such that the diameter is slightly too large with respect to the available diameter of an axial channel in positioned state, a cutting effect arises, wherein the screw makes space for itself by pushing material of the tube and/or recess surface away, causing plastic deformation. By pushing this material away, the screw is clamped inside the channel in an anchored state, and the visible imprint after demounting is a proof of that clamping. On the other hand, an additional anchoring is created because the thread hooks in the created imprint, so that for example a relative movement in axial direction is hindered. This contributes further to a durable fixation, without occurrence of play.

Optionally, as defined by claim 11, the anchoring elements comprise screw thread. The anchoring elements are, for example, screws having standard dimensions. Providing screws as anchoring elements contributes to a durable fixation and causes a simple mounting as well. Indeed, it suffices to screw the screws using a standard screw driver, manually operated or mechanically driven, in order to provide sufficient torque.

Optionally, as defined by claim 11, the system comprises at least two and at most four anchoring elements, and preferably three anchoring elements. At least two anchoring elements allow for a symmetrical placement of the anchoring elements, and contribute already to an improved fixation of the coupling piece. However, too large a number of anchoring elements makes mounting more difficult and increases the complexity of the design of the neck element.

Optionally, the neck element comprises contact ribs, which comprise the contact surfaces, and wherein the contact surfaces are elongated and are continuous in axial direction over a distance at least equal to the length of the recess surfaces measured in axial direction. This means that, in a positioned state, there is contact between the sleeve of the neck element and the inner surface of the tube, at narrow elongated contact surfaces. This contributes to a proper fixation, but also to a simpler positioning than when large contact surfaces are present which cause too much friction. Since the contact surfaces have a length at least equal to the length of the recess surfaces, the pressures applied to the anchoring elements are optimally distributed to the contact surfaces, over their entire length.

Optionally, the recess surfaces and the contact surfaces are distributed over the circumference of the sleeve according to an alternating pattern of one or multiple of the recess surfaces and one or multiple of the contact surfaces. Such an arrangement of recess surfaces and contact surfaces contributes to an even distribution of clamping through a contact surface at one hand and anchoring through and anchoring element at the other hand. This contributes to an improved fixation, in which deformation in the surface of the tube are avoided as well.

Optionally, the transitional element comprises a support surface adapted to contact in the anchored state a transverse end of the tube, and the transitional element comprises one or multiple openings which in a positioned state give access to the axial channels. In a positioned state, the support surface of the transitional element is located just outside the tube, according to a direction perpendicular to the axial direction. The support surface contacts herein the end of the tube. The friction accompanying this contributes further to an improved fixation of the coupling piece with the tube. Moreover, in order to give access to the axial channels in a positioned state, multiple openings are provided in the transitional element. The number of these openings typically corresponds to the number of recess surfaces, thereby corresponding to the number of anchoring elements used within the system.

According to a second aspect of the present invention, the objectives identified above are achieved by a method for mounting a rollable screen comprising:

- providing a screen roll adapted to roll-up and unroll the screen through rotation about an axial direction, and comprising an end having a hollow tube;
- providing a coupling piece comprising
  - a neck element comprising a sleeve, and
  - a transitional element fixedly connected to the neck element;
- providing one or multiple anchoring elements;
- positioning the sleeve in axial direction inside the tube, wherein contact surfaces comprised in the sleeve contact the tube, and wherein recess surfaces comprised in the sleeve define axial channels between the neck element and the tube;
- fastening the neck element detachably to the tube by means of the anchoring elements, wherein the anchoring elements are clamped inside the axial channels, with an even along the axial direction;
- supporting the screen roll by means of the transitional element.

BRIEF DESCRIPTION OF THE DRAWINGS

FIG. 10 shows a different embodiment than the embodiment shown in the FIGS. 1 to 9.

DETAILED DESCRIPTION OF THE EMBODIMENTS

FIG. 1 to FIG. 9 illustrate a first possible embodiment of a system 100 according to the invention. The system 100 comprises a screen roll 200, a coupling piece 102 and anchoring elements 103.

Figure 2:
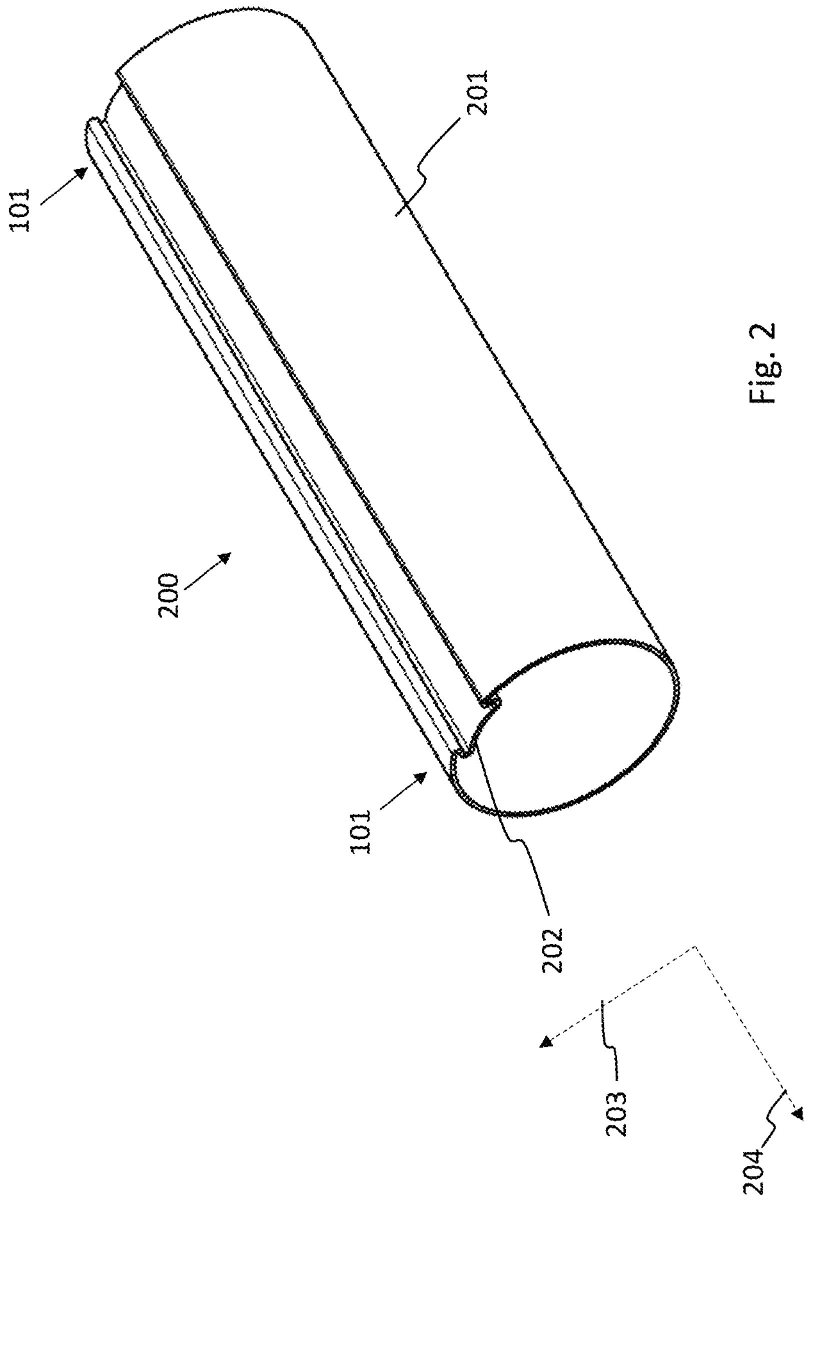
FIG. 2, FIG. 3 and FIG. 4 show the individual parts of the system shown in FIG. 1.

In FIG. 2, the screen roll 200 is represented separately. In the embodiment of FIG. 2, the screen roll 200 is cylindrical, having a smooth outer surface 203 and a hollow tube 101 at both ends. The screen roll 200 has a notch 202, adapted to attach to a screen fabric. Such a facility is for example described in BE1025413. By rotating the screen roll 200 about the axial direction 204, the screen is rolled up or rolled down. The radial direction 203 is also indicated in FIG. 2.

Figure 1:
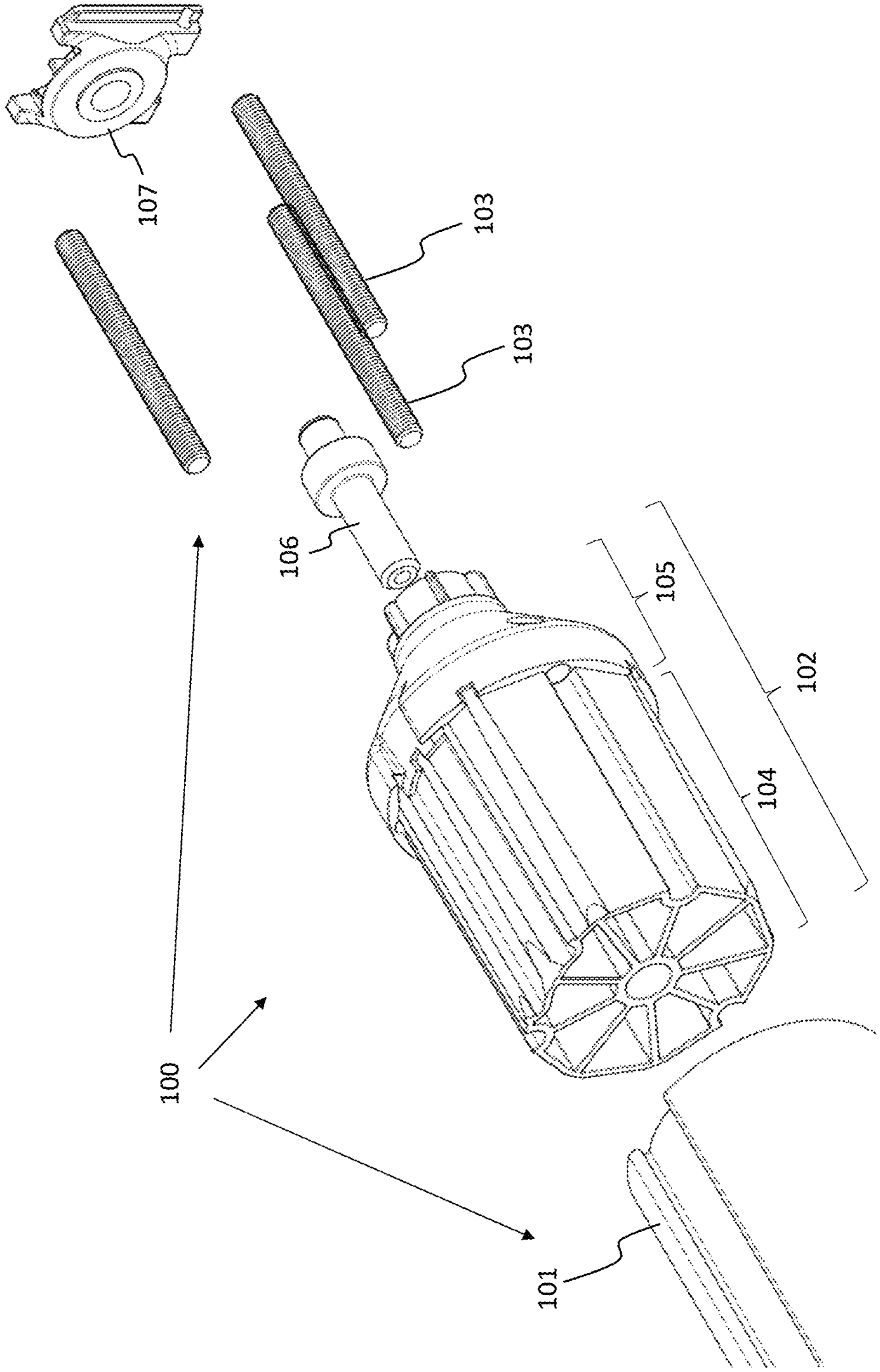
FIG. 1 shows an exploded view of a system for mounting a roll up and roll down screen, according to an embodiment of the invention.
Figure 3:
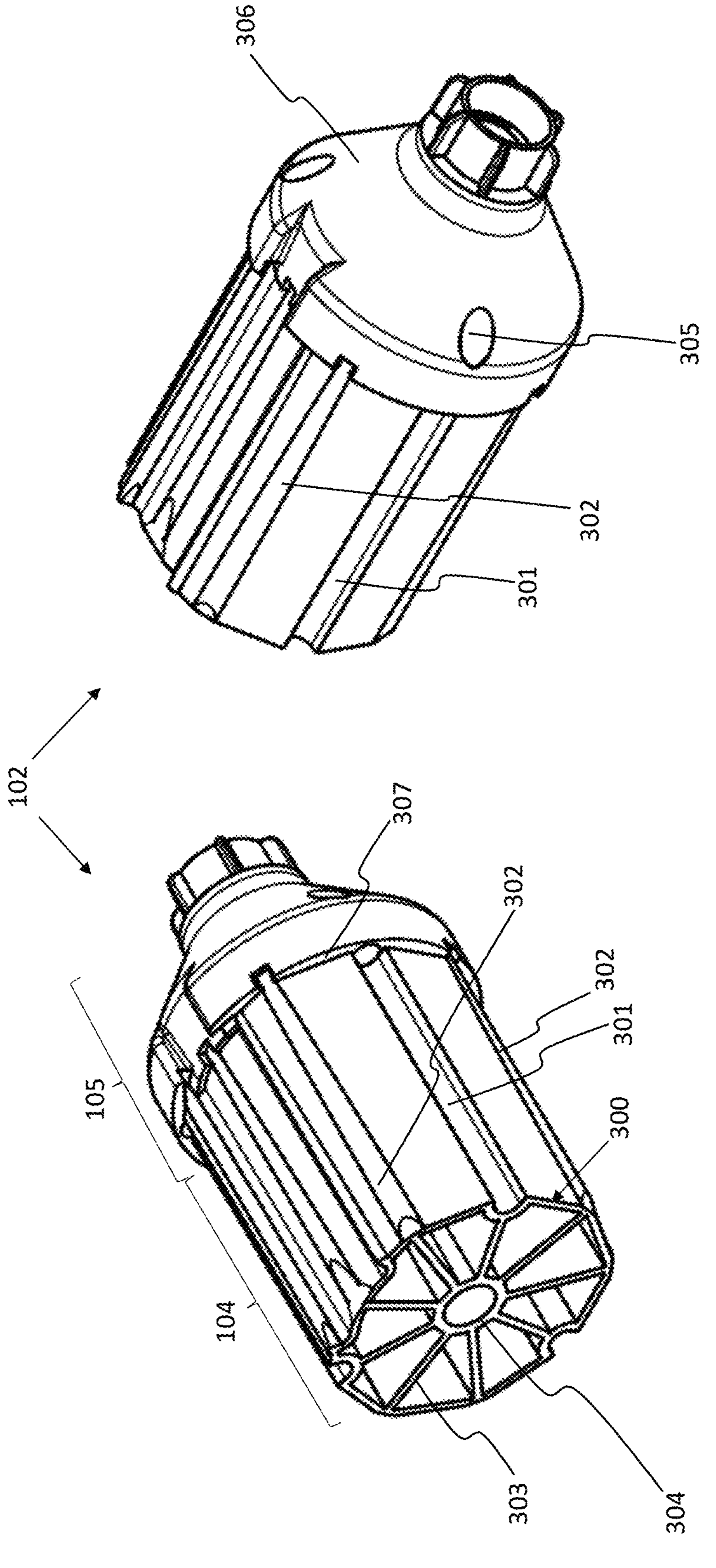
Figure 5:
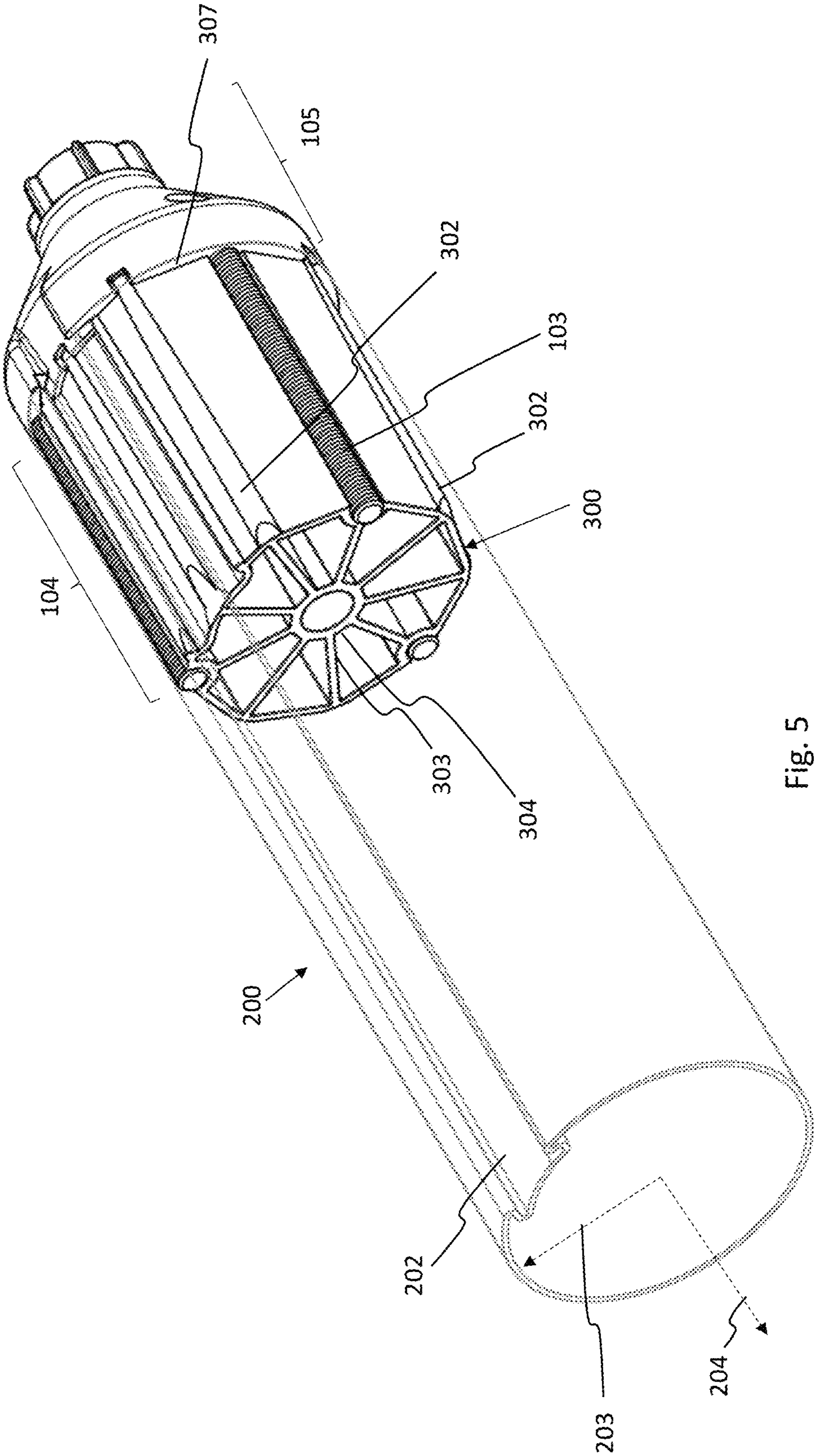
FIG. 5 shows a system for mounting a roll up and roll down screen in assembled state, according to an embodiment of the invention.

In FIG. 3, the coupling piece 102 is represented separately. The coupling piece 102 comprises a neck element 104 and a transitional element 105 fixedly connected to the neck element 104. In a mounted state, as shown in FIG. 5, the neck element 104 is located inside the hollow tube 101, while the transitional element 105 is located outside the screen roll 200. The transitional element 105 is adapted to support the screen roll 200 when rolling the screen up and down. FIG. 1 shows an axis 106 which is at the one end connected to the transitional element 105 and may at the other end be mounted in a bearing 107. The bearing 107 is for example attached to a housing. In the shown embodiments, the transitional element 105 comprises a conical portion 306. Such a conus shape is favorable for providing space at the side of a rolled screen fabric and is for example described in WO2017/195087.

Figures 7, 7A, 7B, 7C:
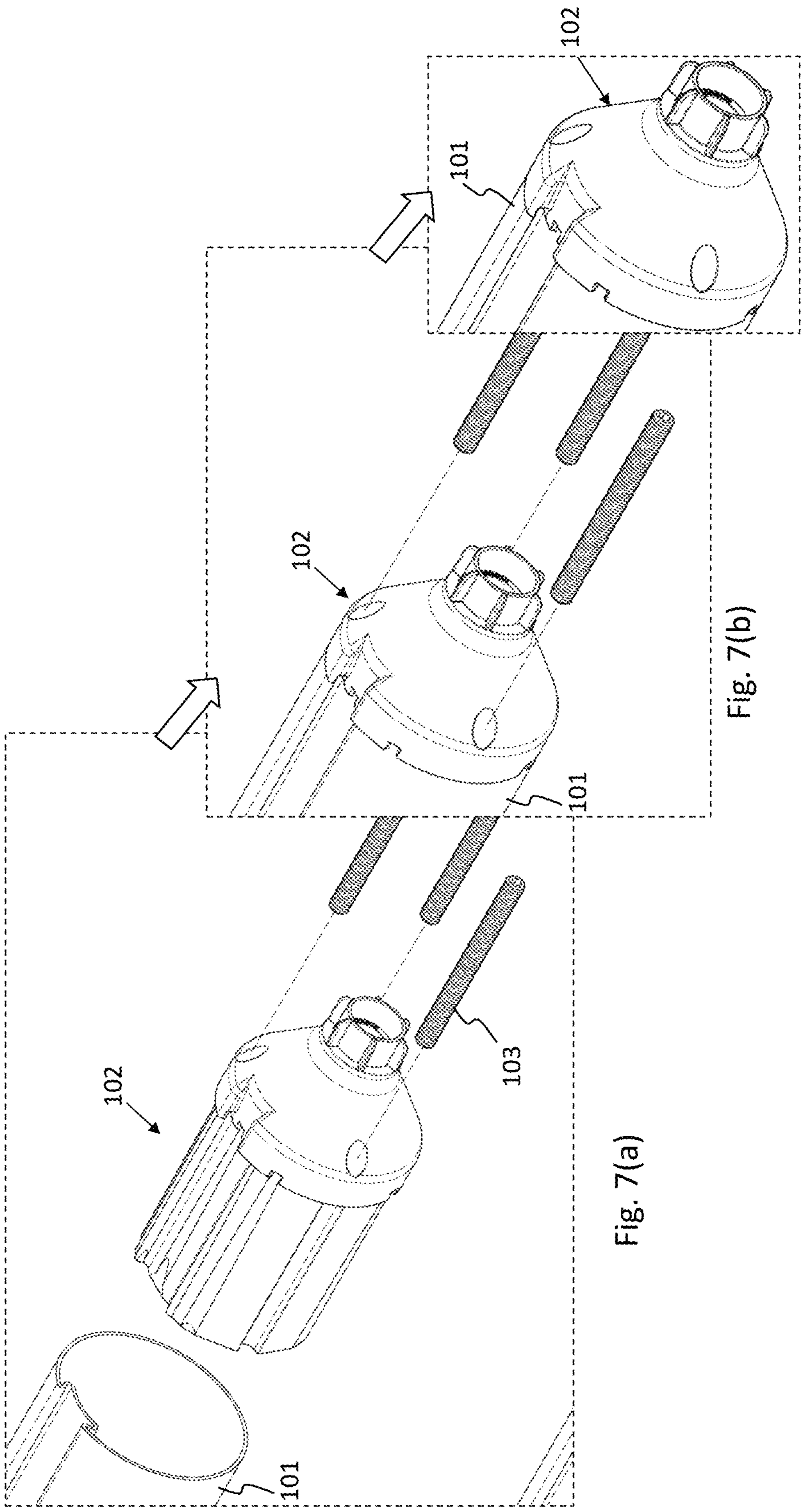
FIG. 7, including FIGS. 7(*a*) to 7(*c*), and FIG. 8 illustrate a method for mounting a roll up and roll down screen, according to an embodiment of the invention.

The neck element 104 comprises a sleeve 300, adapted to be positioned inside the tube 101 in axial direction 204. In this embodiment, the sleeve 300 forms an outer wall of the neck element 104. The positioned state refers to the state in which the neck element 104 was disposed inside the hollow tube 101, as indicated in FIG. 7(*b*). The central axis of the neck element 104 is then according to the axial direction 204 of the screen roll 200, as is clear from FIG. 1 and FIG. 5. The central axis of the neck element 104 then defines the axial direction 204 of the neck element 104 as well, and a distance measured according to this axial direction 204 is defined as a length.

The sleeve of the neck element 104 comprises contact surfaces 302 and recess surfaces 301. In a positioned state, the contact surfaces 302 contact the inner wall of the tube 101. In the shown embodiment, the contact surfaces 302 comprise contact ribs, which clamp the neck element 104 inside the tube 101 in a positioned state. The contact ribs run in axial direction and extend over the length of the neck element 104. Between the contact ribs there is every time a zone of the sleeve 300 located where in a positioned state no contact is made with the hollow tube 101. Other embodiments of contact surfaces are however possible within the invention, for example contact ribs shorter than the length of the neck element 104 or having an interruption or contact surfaces extending between two recess surfaces 301.

In the shown embodiments, the recess surfaces 301 are implemented as recesses in the sleeve 300, which run continuous over the entire length of the neck element 104. In a cross section, the recess surfaces 301 are symmetrically distributed over the sleeve 300, with every time two contact surfaces 302 between two recess surfaces 301.

Figure 6B:
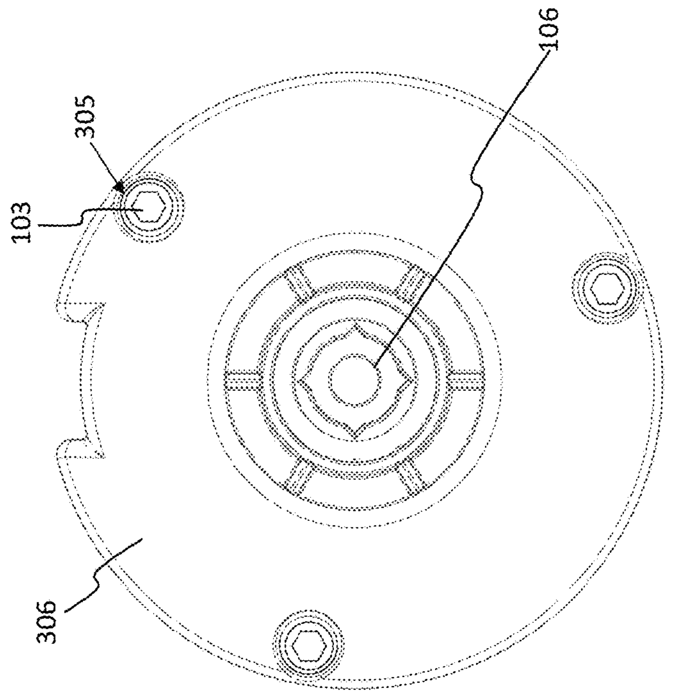
FIG. 6, including FIGS. 6(*a*) and 6(*b*). gives a rear and front view of this.
Figure 6:
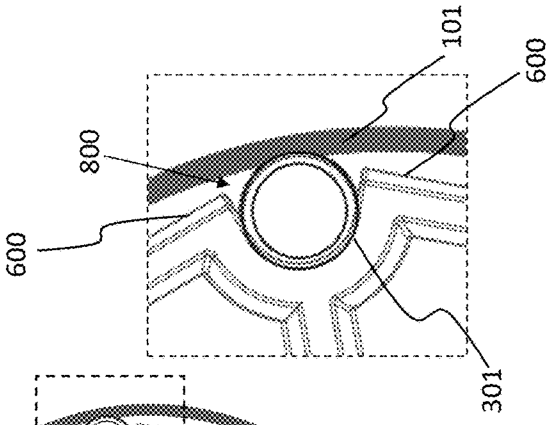
Figure 6A:
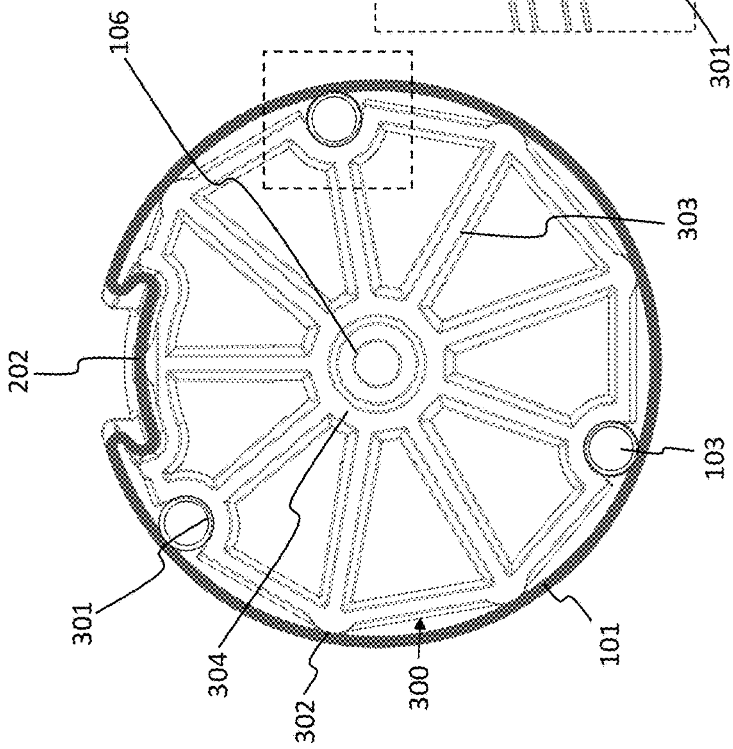
Figure 8:
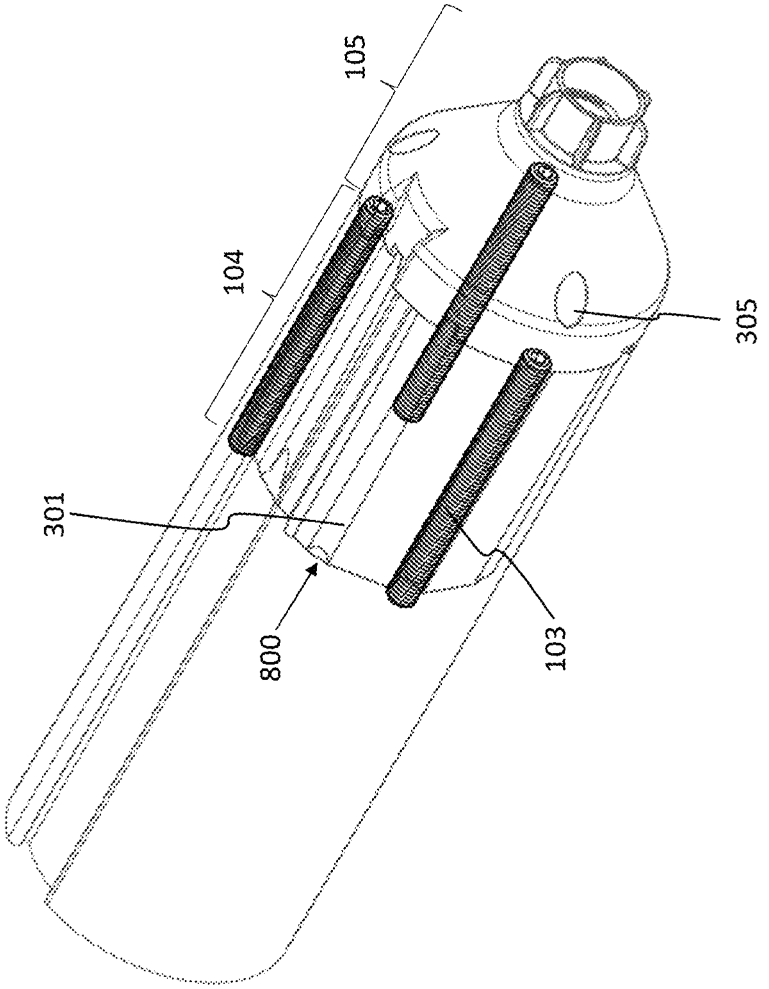

The recess surfaces 301 define in a positioned state axial channels 800 between the neck element 104 and the tube 101. These axial channels 800 are indicated in FIG. 6 and FIG. 8. The detail enlarged in FIG. 6, shows that in this embodiment, an axial channel 800 is not completely closed: the recess surface 301 and the inner wall of the tube 101 indeed define the axial channel 800, but at the level of the surfaces 600 of the sleeve 300 there is no contact with the tube 101, so that the axial channel 800 shows a limited opening at two locations. FIG. 6 and FIG. 8 also show that the axial channels 800 provide space for disposing the anchoring elements 103. It is clear from FIG. 8 that an anchoring element 103 is disposed through an opening 305 in the transitional element 105 in an axial channel 800.

In the shown embodiment, an axial channel 800 has a constant cross section over the length of the neck element 104. Other embodiments are however also possible, for example in which an axial channel widens or narrows in axial direction, or in which a cross section of an axial channel is completely closed, or in which an axial channel is not continuous over the entire length of the neck element 104.

FIG. 3 shows furthermore that the neck element 104 of the coupling piece 102 comprises reinforcing material 303, in this embodiment executed as reinforcing ribs 303. The reinforcing ribs 303 are also visible in FIG. 6(*a*), where a rear view is shown of a coupling piece 102 mounted on a tube 101. The reinforcing ribs 303 form a radial connection between the sleeve 300 and a central element 304. The central element 304 is in this embodiment an annular element centrally inside the neck element 104. The radial direction of the reinforcing ribs 303 is defined as the radial direction 203 of the screen roll 200, when the neck element 104 is positioned in the tube 101, see for example FIG. 5. Due to the presence of the reinforcing ribs 303, the radial stiffness of the neck element 104 increases with respect to a version of the neck element 104 which is completely hollow.

FIG. 6(*a*) shows that in this embodiment three of the reinforcing ribs 303 form a connection between a recess surface 301 and the central element 304, and six of the reinforcing ribs 303 form a connection between a connection surface 302 and the central element 304. One reinforcing rib 303 forms a connection between the recess 202 in the screen tube 200 and the central element 304. In the shown embodiment, the reinforcing ribs run over the length of the neck element 104. Other embodiments of reinforcing material are possible, for example a solid filling inside the sleeve 300, a thick wall of the neck element 104, or reinforcing material which is not continuous over the length of the neck element 104.

FIG. 3 shows furthermore that the transitional element 105 of the coupling pieces 102 comprises a support surface 307. In an anchored state, this support surface 307 contacts the transverse end of the tube 101, as is visible in FIG. 5. The friction occurring hereby causes an additional fixation of the coupling piece 102 to the tube 101.

Figure 4:
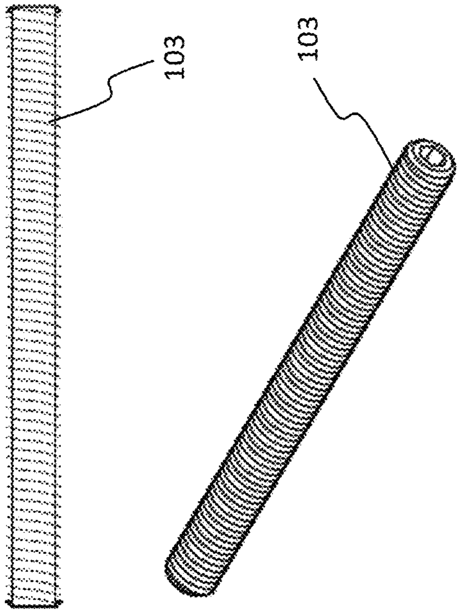

The anchoring elements 103 are represented separately in FIG. 4. In this embodiment, the anchoring elements are screws 103, having thread disposed at their cylindrical outer surface. The screws 103 are screwed into the axial channels 800 after positioning the neck element 104. Access to the axial channels 800 is provided through the openings 305 in the transitional element 105. In this embodiment, the screws 103 are about as long as the length of the neck element 104, so that in an anchored state the entire length of an axial channel 800 is occupied by a screw 103. In general, in possible embodiments, the length of an anchoring element 103 is preferably larger than or equal to the length of the neck element 104. In this way, a large momentum may definitely be absorbed at the two extreme points of the neck element 104, which is at least equal to the momentum caused by force transfer from tube to bearing.

Figure 9:
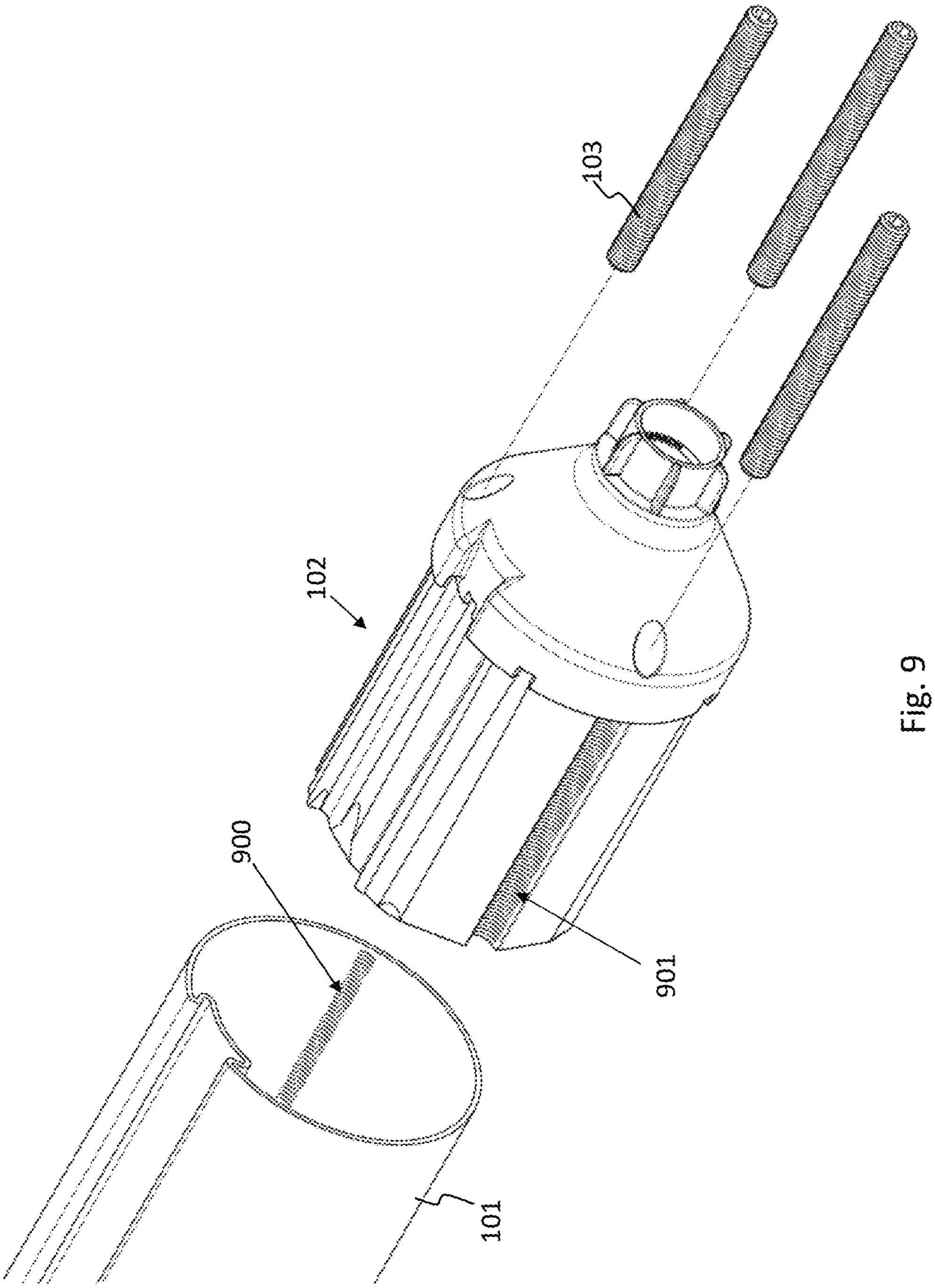
FIG. 9 illustrates the presence of plastic deformations in the screen roll and the coupling piece after demounting the coupling piece, in an embodiment of the invention.

During the screwing movement for disposing a screw 103, the thread cuts into the material, for example plastic, of the tube 101 and the neck element 104. Thus, a plastic deformation occurs in the material of the tube 101 and the neck element 104, which is an imprint of the thread. In an anchored state, the screw 103 is at the one side clamped inside the axial channel 800, since the screw 103 has to make space for itself when being disposed. On the other hand, an additional anchoring is created because in an anchored state the thread hooks into the created imprint. The clamping of a screw 103 is even of the axial direction, considering the constant cross section of both the screw 103 and the axial channel 800. the imprints made by a screw 103 in the material of the tube 101 and the neck element 104 are visible after unscrewing a screw 103. FIG. 9 shows an imprint 901 in a recess surface 301 and an imprint 900 in the tube 101.

FIG. 7 illustrates the steps when mounting the system 100 as shown in the previous figures. In step (a), a hollow tube 101, a coupling piece 102 and anchoring elements 103 are provided. Then the neck element 104 of the coupling piece 102 is positioned inside the tube 101. This results in the positioned state as represented in FIG. 7(*b*). Positioning occurs for example by tapping on the transitional element 105 using a hammer, wherein the neck element 104 slides gradually into the tube 101. Then, the anchoring elements 103, here screws 103, are disposed. In the shown embodiment, the screws 103 are screwed into the axial channels 800 by means of a screwing movement. This is also visible in FIG. 8. For example, a standard screwdriver is used. Access to the axial channels 800 is provided by the openings 305 in the transitional elements 105. The state obtained in FIG. 7(*c*) is the anchored state, where the coupling piece 102 is fixed to the screen tube 200.

This method results in a very simple mounting, which may be carried out by workers on site, and in which the even clamping of the anchoring elements 103 is created automatically. Moreover, the anchoring is detachable: by screwing the anchoring elements 103 back, the screws 103 are removed, and the coupling piece 102 may then be slid out of the screen roll 200. Imprints 900 and 901 respectively remain in the material of the tube 101 and the neck element 104, as shown in FIG. 9.

The anchored state, as shown in FIG. 7(*c*) is also depicted in FIG. 5 and Fi. 6. In this state, an optimal fixation of the coupling piece 102 to the screen tube 200 is obtained. This fixation is realized on the one hand by clamping of the contact surfaces 301 inside the tube 101, and on the other hand by clamping and anchoring of the screws 103 in the axial channels 800. Since clamping of the contact surfaces 301 and anchoring elements 103 is even over the axial direction, and the reinforcing ribs 303 ensure that pressures applied by the anchoring elements 103 are homogeneously distributed to the contact surfaces 104, the neck element 104 is optimally fixed over its entire length. This avoids that in time play occurs between the coupling piece 102 and the tube 101. Moreover, because of the combination of clamping through the contact surfaces 104 and anchoring through the anchoring elements 103, deformations of the tube 101 are avoided. Finally, the system is easily applicable in diverse types of screen rolls 200. Where necessary, the number of anchoring elements 103 or their diameter may be scaled with the roll diameter in function of the diameter of the screen roll 200.

In a test set-up, a solution according to the invention was compared to other solutions. More particularly, the number of cycles was measured from when noise is audible as a result of play occurring between the coupling piece 102 and the screen roll 200. One cycle corresponds to a moving up and down of the screen. The solution according to the invention relates to an embodiment as depicted in FIGS. 1 to 9. Herein three screw DIN 938 M8×90-A2 are used as anchoring elements 103. The length of the neck element 104 is preferably in the range of 0.8 to 1.2 times the outer diameter of the tube 101, in order to, on the one hand, obtain sufficient anchoring and, on the other hand, limit the amount of material and also allow for narrow screens. In the test set-up, the length of the neck element 104 was about equal to the length of the anchoring elements 103. The coupling piece 102 was manufactured in PA (PolyAmide).

In the test set-up, over 10,000 cycles were performed using this embodiment of the invention before noise resulting from play was noticeable. Other solutions tested, which do not fall in the scope of the invention, are:

(1) a fabric tube plug executes as the coupling piece 102 in previous figures, but without the recess surfaces 301, without the reinforcing ribs 303 and without the anchoring elements 103. The fabric tube plug was manufactured from PA (PolyAmide), and the fixation to the screen roll 200 was solely supported by clamping through contact ribs 302. A noise was measured herein from 0 to 3000 cycles, depending on the weather conditions.

(2) The same design of fabric tube plug as the previous test, but executed in a different material, namely glass fiber reinforced PA. A noise was measured herein from 1800 cycles.

(3) The same fabric tube plug as in test (1), but using a lubricant. Noise was measured herein from 0 to 3000 cycles, depending on the type of lubricant.

(4) The same fabric tube plug as in test (1), but with addition of an adhesive between tube and plug. This anchoring is not detachable. Noise was measured herein from 6900 cycles.

(5) The same fabric tube plug as in test (1), but with adding of recess surfaces and conic aluminum plugs having a helix as anchoring elements. The clamping is herein not even over the axial direction, and no reinforcing material is present. Noise was measured herein after 0 cycles.

(6) The same fabric tube plug as in test (1), but with adding of recess surfaces and small adjusting screws as anchoring elements. There is no reinforcing material present, and the screws are shorter than the neck element 104. Noise was measured herein from 3000 cycles.

(7) The same fabric tube plug as in test (1), but with adding of recess surfaces and large screws M8. The large screws were disposed in cavities for conic plugs. No reinforcing material is present. Noise was measured herein from 6000 cycles.

The above shows clearly that with the embodiment according to the invention, where play only occurs after more than 10,000 cycles, a more durable fixation is obtained.

In the embodiment shown in FIGS. 1 to 9, use is made of screws as anchoring elements 103, clamped inside axial channels 800 having a constant cross section. However, other embodiments are also possible. For example, use is made of cylindrical elements as anchoring elements without thread, which are clamped inside axial channels having constant cross section. In yet other embodiments, the anchoring elements and the axial channels have a cross section varying over the axial direction. Such an embodiment is illustrated in FIG. 10.

Figure 10:
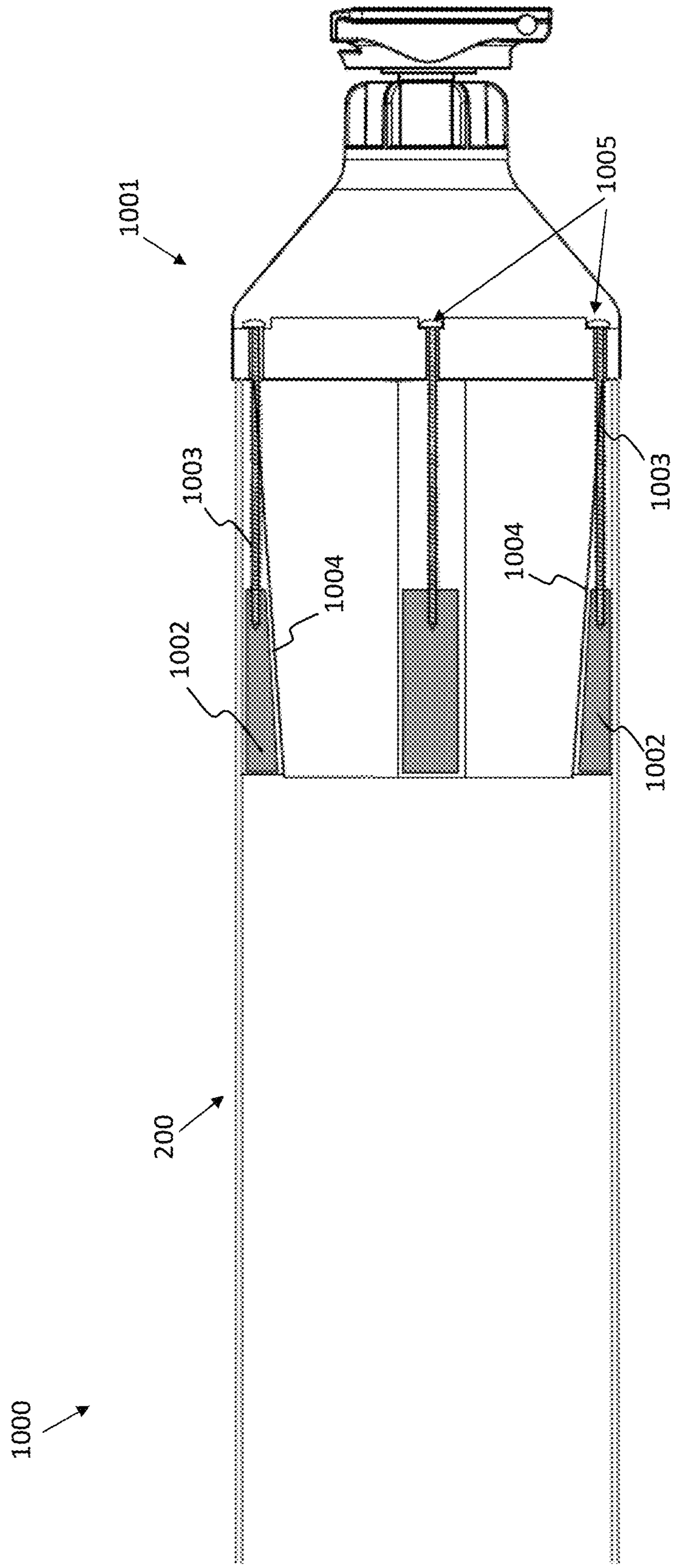
FIG. 10 shows a system for mounting a roll up and roll down screen, according to an embodiment of the invention.

FIG. 10 shows a system 1000, comprising a screen roll 200, a coupling piece 1001 and anchoring elements 1002. In this embodiment, an anchoring element 1002 has the shape of a wedge, and no thread or other profile is present on the anchoring element 1002. FIG. 10 shows the positioned state, not the final anchored state.

An anchoring element 1002 is located inside an axial channel, of which the cross section increases in axial direction, from left to right on FIG. 10. This is realized by the presence of recess surfaces 1004 forming an inclined plane, as is visible in the figure. For spanning the wedge-shaped anchoring elements 1002, use is made of span screws 1003. The span screws 1005 are herein accessible through openings 1005 in the transitional element. By turning the screws 1005, for example by means of a screwdriver, the screw 1005 remains in the same position, while the wedge 1002 moves in axial direction, on FIG. 10 from left to right. The wedge 1002 is hereby clamped inside the axial channel. Since the shape of the wedges 1002 and the axial channels are matched, namely, both reduce in cross section from left to right in the figure, the anchoring elements 1002 are evenly clamped inside the axial channels.

Although the present invention was illustrated by means of specific embodiments, it will be clear for the person skilled in the art that the invention is not limited to the details of the foregoing illustrative embodiments, and that the present invention may be executed with different modifications and adaptations without departing from the field of application of the invention. The present embodiments should therefore in all respects be considered as illustrative and not restrictive, wherein the field of application of the invention is described by attached claims and not by the foregoing description, and all modifications which fall within the meaning and scope of the claims are therefore included. In other words, it is understood to include all modifications, variations or equivalents falling within the are of application of the underlying basic principles and of which the essential attributes are claimed in this patent application. Moreover, the reader of this patent application will understand that the words “comprising” or “to comprise” do not exclude other elements or other steps, and that the word “a(n)” does not exclude plural. Possible references in the claims may not be understood as a limitation of the respective claims. The terms “first”, “second”, “third”, “a”, “b”, “c” and the like, when used in the description or in the claims, are used to distinguish between similar elements or steps and do not necessarily describe a successive or chronological order. The terms “top”, “bottom”, “over”, “under” and the like are used in the same way with respect to the description and do not refer necessarily to relative positions. It should be understood that these terms are mutually interchangeable under the right conditions and the embodiments of the invention are able to function according to the present invention in other orders or orientations than those described or illustrated in the above.

The invention claimed is:

1. A system for mounting a rollable screen, comprising:

a screen roll adapted to roll-up and unroll said screen through rotation about an axial direction, and comprising an end having a hollow tube;

a coupling piece comprising:

a neck element, comprising a sleeve adapted to be positioned in the axial direction inside said tube, wherein contact surfaces comprised in said sleeve contact said tube, and wherein recess surfaces comprised in said sleeve define axial channels between said neck element and said tube;

a transitional element fixedly connected to said neck element, adapted to support said screen roll during said rolling-up or unrolling, one or multiple anchoring elements, adapted to fasten said neck element detachably to said tube, wherein in an anchored state said anchoring elements are clamped inside said axial channels, with an even clamping along the axial direction.

2. The system according to claim 1, wherein said neck element is adapted to be positioned in the axial direction inside said tube and said neck element is hereby clamped in said tube through said contact surfaces.

3. The system according to claim 1, wherein said recess surfaces are continuous in the axial direction over a distance equal to the distance of said neck element in the axial direction and said recess surfaces have substantially the same cross section over an entire length of each recess surface in the axial direction.

4. The system according to claim 1, wherein said anchoring elements have a length at least equal to the length of said neck element in the axial direction.

5. The system according to claim 1, wherein said system comprises at least two anchoring elements.

6. The system according to claim 1, wherein said neck element comprises contact ribs, which comprise said contact surfaces, and wherein said contact surfaces are elongated and are continuous in the axial direction over a distance at least equal to the length of said recess surfaces in the axial direction.

7. The system according to claim 1, wherein said recess surfaces and said contact surfaces are distributed over the circumference of said sleeve according to an alternating pattern of one or multiple of said recess surfaces and one or multiple of said contact surfaces.

8. The system according to claim 1, wherein said transitional element comprises a support surface adapted to contact in said anchored state a transverse end of said tube, and wherein said transitional element comprises one or multiple openings which in positioned state give access to said axial channels.

9. The system according to claim 1, wherein at least in certain cross sections of said neck element, reinforcing material is present inside said sleeve, adapted to increase radial stiffness of said neck element.

10. The system according to claim 9, wherein said reinforcing material is continuous in the axial direction, over a distance at least equal to the length of said recess surfaces in the axial direction.

11. The system according to claim 9, wherein said reinforcing material consists of reinforcing ribs, which in said certain cross sections form a radial connection between said sleeve and a central element within said cross sections.

12. The system according to claim 11, wherein said radial connection is formed at least for a number of said reinforcing ribs between one of said recess surfaces and said central element or between one of said contact surfaces and said central element.

13. The system according to claim 1, wherein said anchoring elements have a profile, wherein said recess surfaces and/or said tube corresponding to an imprint of said profile are plastically deformed when said anchoring elements are in an anchored state.

14. The system according to claim 13, wherein each of said anchoring elements comprise a screw thread.

15. A method for mounting a rollable screen, comprising:

providing a screen roll adapted to roll-up and unroll said screen through rotation about an axial direction, and comprising an end having a hollow tube;

providing a coupling piece comprising:

a neck element comprising a sleeve, and a transitional element fixedly connected to said neck element;

providing one or multiple anchoring elements;

positioning said sleeve in the axial direction inside said tube, wherein contact surfaces comprised in said sleeve contact said tube, and wherein recess surfaces comprised in said sleeve define axial channels between said neck element and said tube;

fastening said neck element detachably to said tube by means of said anchoring elements, wherein said anchoring elements are clamped inside said axial channels, with an even clamping along the axial direction;

supporting said screen roll by means of said transitional element.

* * * * *